June 11, 1935.  W. S. HAMM  2,004,722
WEATHER STRIP
Filed Feb. 27, 1933
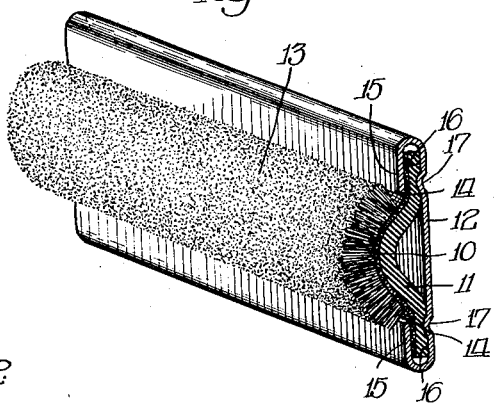
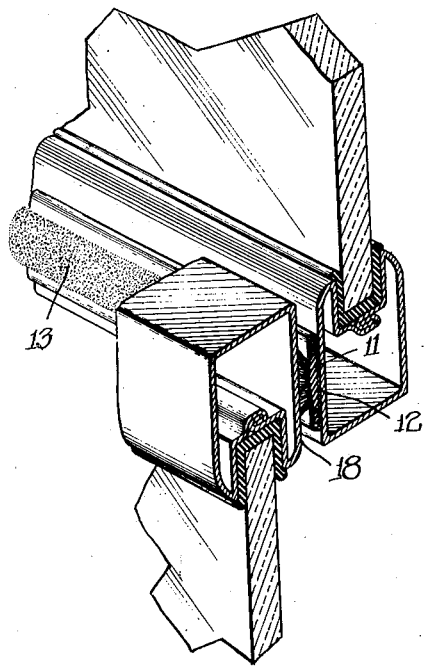
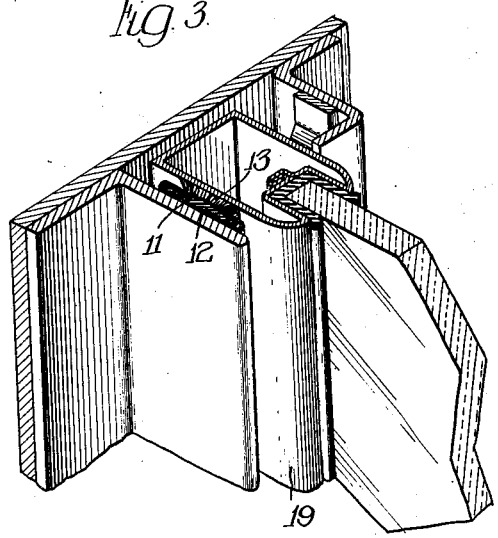
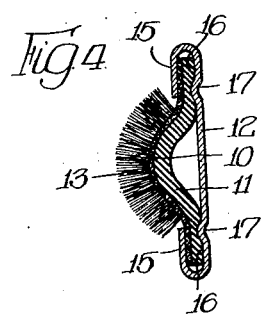
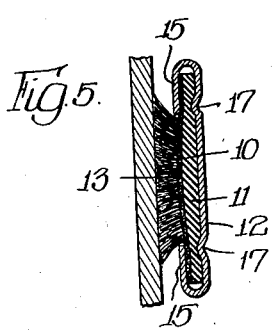
Inventor:
William S. Hamm, Patented June 11, 1935

2,004,722

UNITED STATES PATENT OFFICE 2,004,722

WEATHER STRIP

William S. Hamm, Elkhart, Ind., assignor to The Adlake Company, Chicago, Ill., a corporation of Illinois Application February 27, 1933, Serial No. 658,676

3 Claims. (Cl. 189—65)

The purpose of this invention is to provide an improved weather strip of the so-called carpet or pile fabric type which is so constructed as to adapt itself readily and with uniform sealing efficiency to clearance openings of various sizes.

The improved weather strip is especially well suited for use as a top rail weather strip, but it may also be used advantageously in association with guides for free working sash.

While the foregoing statements are indicative in a general way of the nature of the invention, other more specific objects and advantages will be apparent to those skilled in the art upon a full understanding of the construction, arrangement and operation of the parts which together constitute the improved weather strip.

One embodiment of the invention is presented herein by way of exemplification, but it will of course be appreciated that the invention may be incorporated in other structurally modified forms coming equally within the scope of the appended claims.

In the accompanying drawing:

Fig. 1 is a perspective view of a short length of the improved weather strip;

Fig. 2 is a fragmentary perspective view of a sash, showing the weather strip utilized as a top rail weather strip;

Fig. 3 is another fragmentary perspective view of a sash, showing the weather strip positioned in one of the guides of a vertically slidable free working sash;

Fig. 4 is a transverse section through the weather strip, with the latter in an uncompressed condition; and Fig. 5 is a similar view, showing the weather strip as it appears when fully compressed by engagement with some surface.

Referring in more detail to the drawing, it will be observed that the improved weather strip comprises a relatively thin soft pile fabric strip 10, a relatively thick resiliently compressible rubber strip 11, and a sheet metal holding strip 12. The pile 13 on the fabric strip 10 projects outwardly and preferably terminates short of the edges of the strip at 14, leaving the edges plain. The rubber strip 11 is coextensive with the fabric strip 10 and is cemented securely to the same throughout its entire area. The metal strip 12 is substantially flat and is provided at its edges with inturned flanges 15 which form grooves 16 in which the edges of the fabric and rubber strips are tightly clamped. The center portions of the fabric and rubber strips are bowed outwardly away from the back of the metal strip, as clearly shown in Figs. 1 and 4. The metal strip is preferably indented throughout its length at 17 in order to prevent any movement of the edges of the fabric and rubber strips within the grooves 16.

When the weather strip is compressed against a surface, such as the top rail 18 of a sash, as shown in Fig. 2, or one of the side rails 19 of a sash, as shown in Fig. 3, the fullness in the unified fabric and rubber strips 10 and 11 will be absorbed by the resilient compressibility of the rubber strip and the fabric and rubber strips will assume the flattened out position shown in Fig. 5. As soon as the pressure on the weather strip is relieved, the fabric and rubber strips will immediately reassume the position shown in Fig. 4.

The rubber strip 11, in addition to maintaining the pile fabric strip 10 in proper sealing position at all times, prevents the edges of the fabric strip from fraying or pulling out of the grooves in the metal strip, thereby insuring long service. The metal strip 12 is intended to be attached to the sash, guide or other surface by any suitable means.

I claim:

1. A weather strip which comprises a pile fabric strip, a rubber strip secured to the back of the fabric strip, and a metal strip positioned behind the rubber strip and provided with inturned edge flanges which are clamped against the edges of the fabric and rubber strips with the center portions of the latter bowed away from the center portion of the metal strip.

2. A weather strip which comprises a contact strip, and a sheet metal backing strip provided with inturned edge flanges which are clamped against the edges of the contact strip, said backing strip being provided with indentations adjacent the flanges for interlocking engagement with the contact strip.

3. A weather strip which comprises a pile fabric strip, a rubber strip secured to the back of the fabric strip, and a metal strip positioned behind the rubber strip and provided with inturned edge flanges which are clamped against the edges of the fabric and rubber strips with the center portions of the latter bowed away from the center portion of the metal strip, said backing strip being provided in the back thereof with longitudinally extending indentations in opposition to the edges of the flanges for embedded engagement with the interposed portions of the rubber strip.

WILLIAM S. HAMM.